United States Patent [19]
Nishida

[11] Patent Number: 5,107,515
[45] Date of Patent: Apr. 21, 1992

[54] NARROW-BAND LASER APPARATUS
[75] Inventor: Naoto Nishida, Yokohama, Japan
[73] Assignee: Kabushiki Kaisha Toshiba, Kawasaki, Japan
[21] Appl. No.: 607,683
[22] Filed: Nov. 1, 1990
[30] Foreign Application Priority Data Nov. 8, 1989 [JP] Japan .................................. 1-288844
Mar. 9, 1990 [JP] Japan .................................. 2-56447

[51] Int. Cl.$^5$ ........................................... H01S 3/082
[52] U.S. Cl. ...................................... 372/97; 372/102; 372/98
[58] Field of Search ...................... 372/108, 97, 19, 98, 372/102, 9

[56] References Cited
U.S. PATENT DOCUMENTS 4,985,898  1/1991  Furuya et al. ........................ 372/102
4,991,178  2/1991  Wari et al. ........................... 372/108

OTHER PUBLICATIONS

IEEE Journal of Quantum Electronics, QE-23, 1458-1460, "Simple Long-Pulse XeCl Laser with Narrow-Line Output"; M. Sugii et al.; Sep. 1987.
The Review of Laser Engineering, 17, 50-57, "High Brightness Excimer Laser Oscillator-Amplifier"; T. Enami et al.; Jan. 1989 (in Japan).
Japanese Journal of Optics, 19, 109-112, "A Spectrally Narrowed KrF Excimer Laser Using a Multimirror Laser Cavity"; Y. Shimada et al.; Feb. 1990.

Primary Examiner—William L. Sikes
Assistant Examiner—Susan S. Morse
Attorney, Agent, or Firm—Oblon, Spivak, McClelland, Maier & Neustadt

[57] ABSTRACT

Part of a laser beam, which is generated by a laser tube and reflected by a reflection surface of a high-reflectance mirror to travel while diverging at the predetermined angle, is divided by a dividing mirror. The spectral band width of the divided laser beam is narrowed by an etalon and a diffraction grating. The laser beam with the narrowed spectral band width is reflected by a high-reflectance return mirror, returned to the laser tube, and amplified in the laser tube. The laser beam with the narrowed spectral band width is amplified in substantially the same space within the laser tube where the laser beam was generated.

15 Claims, 6 Drawing Sheets

[PRIOR ART]

NARROW-BAND LASER APPARATUS

BACKGROUND OF THE INVENTION

1. Field of the Invention

The present invention relates to a narrow-band laser apparatus for narrowing the spectral band width of a laser beam.

2. Description of the Related Art

There is known a narrow-band laser apparatus, such as a narrow-band excimer laser, for narrowing the spectral band width of a laser beam with use of a band-narrowing element. The narrow-band laser apparatus uses a self-amplification type optical resonator in order to efficiently obtain a laser beam having a narrowed band. In the narrow-band laser apparatus using the self-amplification type optical resonator, a laser beam generated by a laser excitation unit within a laser tube is reflected by a high-reflectance mirror. The high-reflectance mirror is situated on one side of the laser tube along the optical axis. The reflected laser beam is made incident on another part of the laser excitation unit. Thus, the laser beam is amplified in the laser excitation unit, and the amplified beam is output from the other side of the laser tube along the optical axis. This type of narrow-band laser apparatus can increase the output of the laser beam with a narrowed band several times.

Figure 1:
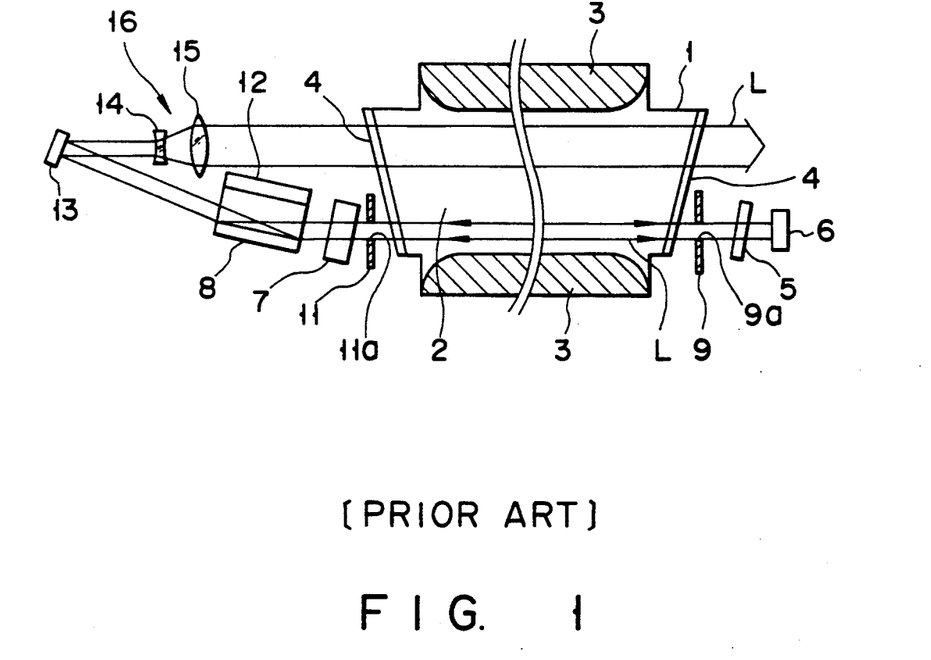
FIG. 1 shows the structure of a conventional narrow-band laser apparatus.

An example of the narrow-band laser apparatus using the self-amplification optical resonator is disclosed in "LASER KENKYU"("Review of Laser Engineering"), Vol. 17, No. 1, 1989, p. 51, FIG. 1. This apparatus is shown in the accompanying FIG. 1. The apparatus comprises a laser tube 1 which is hermetically sealed and contains a gas laser medium. A laser excitation unit 2 is provided within the laser tube 1. The laser excitation unit 2 includes a pair of main electrodes (a cathode and an anode) 3 which are arranged apart from each other and face each other. The main electrodes 3 are supplied with electric power from a high-voltage power source (not shown). When electric power is supplied, a glow discharge occurs between the main electrodes 3. The gas laser medium is excited by the glow discharge, and a laser beam L is generated in a direction perpendicular to the direction of the discharge.

First and second windows 4 are formed in both end faces of the laser tube 1 along the optical axis. A first etalon 5 and a first high-reflectance mirror 6 are arranged on a first side region of the laser tube 1, which faces the first window 4. A second etalon 7 and a grazing incidence type diffraction grating 8 are arranged on a second side region of the laser tube 1. A first restriction plate 9 having a slit 9a is located between the first etalon 5 and the first window 4, and a second restriction plate 11 having a slit 11a is situated between the second etalon 7 and the second window 4. The restriction plates 9 and 11 allow the passage of only that part of the laser beam L generated between the main electrodes 3, which has a desirable optical characteristic.

The diffraction grating 8 has an adjustable mirror 12. The angle of the mirror 12 is adjustable. The mirror 12 is situated to face the diffraction grating 8. The adjustable mirror 12 determines the direction in which the laser beam L (diffracted beam) is emitted from the diffraction grating 8. The laser beam L from the diffraction grating 8 is reflected by a second high-reflectance mirror 13 situated o the second side of the laser tube 1. The diameter of the reflected beam is enlarged by a beam expander 16 comprising a concave lens 14 and a convex lens 15. The expanded laser beam L is input to a part of the laser excitation unit 2, which is other than the part in which the beam L was generated. The beam L is amplified by the unit 2 and is output from the first window 4.

In the above structure, the discharge space between the electrodes 3 within the laser excitation unit 2 is divided into a space for generation of a laser beam and a space for amplification of the laser beam. In other words, the space for generating the laser beam L must be separated from the space for amplifying the laser beam L with a narrowed band, because of the arrangement of optical parts necessary for returning the laser beam L to the laser excitation unit 2. As a result, the discharge space within the laser excitation unit 2 must be increased, and accordingly the entire apparatus must be increased in size.

In addition, in the conventional apparatus, the laser beam L is expanded by the beam expander 16 in order to enhance the amplification effect of the laser beam L. Thus, the laser beam L is output through optical parts such as the concave lens 14 and convex lens 15 of the beam expander 16. When the laser beam is passed through the concave lens 14 and convex lens 15, the beam is absorbed or scattered by these optical parts. Thus, the loss of the laser beam L increases, and the output laser beam L contains scattered component.

SUMMARY OF THE INVENTION

The object of the present invention is to provide a narrow-band laser apparatus wherein generation of a laser beam and amplification of the laser beam with a narrowed band can be carried out in substantially the same space, and absorption and scattering of the laser beam with the narrowed band, which is due to the use of many optical parts, can be prevented.

According to one aspect of the present invention, there is provided a narrow-band laser apparatus for narrowing the spectral band width of a laser beam, said apparatus comprising: a laser tube containing a laser medium and having a pair of electrodes for generating a discharge, said laser medium being excited by the discharge between the electrodes, thus generating the laser beam; a high-reflectance mirror having a reflection surface and situated with said reflection surface looking to one end side of the laser tube along the optical axis of the laser beam generated by the laser tube, said reflection surface reflecting the laser beam and causing the beam to travel while diverging at a predetermined angle; dividing means, situated on the other end side of the laser tube, for dividing part of the laser beam which has been reflected by said reflection surface of the high-reflectance mirror to travel while diverging at the predetermined angle; band-narrowing means for narrowing the spectral band width of the laser beam divided by said dividing means; and a high-reflectance return mirror for reflecting the laser beam having the band narrowed by the band-narrowing means, and returning the reflected beam to the dividing means.

According to another aspect of the invention, there is provided a narrow-band laser apparatus for narrowing the spectral band width of a laser beam, said apparatus comprising: a laser tube containing a laser medium and having a pair of electrodes for generating a discharge, said laser medium being excited by the discharge between the electrodes, thus generating the laser beam; a high-reflectance mirror having a reflection surface and situated with said reflection surface looking to one end side of the laser tube along the optical axis of the laser beam generated by the laser tube, said reflection surface reflecting the laser beam and causing the beam to travel while diverging at a predetermined angle; dividing means, situated on the other end side of the laser tube, for dividing part of the laser beam which has been reflected by said reflection surface of the high-reflectance mirror to travel while diverging at the predetermined angle; and band-narrowing means for narrowing the spectral band width of the laser beam divided by said dividing means, and returning the laser beam with the narrowed spectral band width to said dividing means.

According to still another aspect of the invention, there is provided a narrow-band laser apparatus for narrowing the spectral band width of a laser beam, said apparatus comprising: a laser tube containing a laser medium and having a pair of electrodes for generating a discharge, said laser medium being excited by the discharge between the electrodes, thus generating the laser beam; a high-reflectance mirror having a reflection surface and situated with said reflection surface looking to one end side of the laser tube along the optical axis of the laser beam generated by the laser tube, said reflection surface reflecting the laser beam and causing the beam to travel while diverging at a predetermined angle; and band-narrowing means, situated on the other end side of the laser tube along the optical axis, for dividing part of the laser beam which has been reflected by said reflection surface of the high-reflectance mirror to travel while diverging at the predetermined angle, narrowing the spectral band width of the divided laser beam divided, reflecting the laser beam with the narrowed spectral band width, and returning the reflected laser beam to said laser tube.

According to still another aspect of the invention, there is provided a narrow-band laser apparatus for narrowing the spectral band width of a laser beam, said apparatus comprising: a laser tube containing a laser medium and having a pair of electrodes for generating a discharge, said laser medium being excited by the discharge between the electrodes, thus generating the laser beam; a high-reflectance mirror having a reflection surface and situated with said reflection surface looking to one end side of the laser tube along the optical axis of the laser beam generated by the laser tube, said reflection surface reflecting the laser beam and causing the beam to travel while diverging at a predetermined angle; an grazing incidence type diffraction grating, situated on the other end side of the laser tube, for dividing part of the laser beam which has been reflected by said reflection surface of the high-reflectance mirror to travel while diverging at the predetermined angle, narrowing the spectral band width of the divided laser beam divided, and emitting the laser beam with the narrowed spectral band width; and return means, situated to face said grazing incidence type diffraction grating, for returning the laser beam having the spectral band width narrowed by said grazing incidence type diffraction grating to said laser tube.

According to the apparatus of the present invention, generation of a laser beam and amplification of the laser beam can be carried out in substantially the same space, and the laser beam having the spectral band width narrowed can be output without passing the beam through many optical parts.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

Embodiments of the present invention will now be described with reference to the accompanying drawings.

Figures 2, 3:
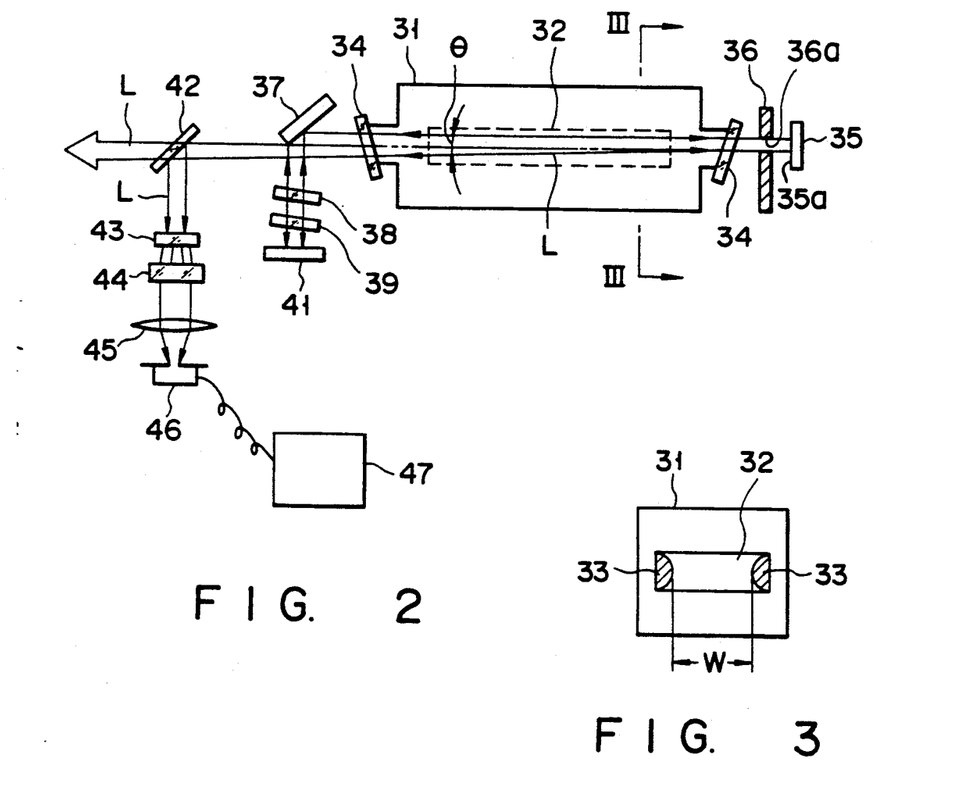
FIG. 2 shows the structure of a narrow-band laser apparatus according to a first embodiment of the present invention.
FIG. 3 is a cross-sectional view of a laser tube, taken along line III—III in FIG. 2.

FIGS. 2 and 3 show a first embodiment of the invention. Reference numeral 31 denotes a laser tube or a sealed container of a gas laser apparatus such as an excimer laser. A gas laser medium is sealed in the laser tube 31. A pair of main electrodes 33 (a cathode and an anode), which constitute a laser excitation unit 32, are disposed in the laser tube 31. The main electrodes 33 are arranged apart from each other, and they face each other. The main electrodes 33 are supplied with a high-voltage electric power from a high-voltage power source (not shown). When the main electrodes 33 are supplied with electric power, a glow discharge is caused between the main electrodes 33 to excite the gas laser medium. Thus, a laser beam L is generated in a direction perpendicular to the direction of discharge.

First and second windows 34 for the passage of the laser beam L generated by the laser excitation unit 32 are formed in both end surfaces (situated along the optical axis) of the laser tube 31. A high-reflectance mirror 35 is located on a first end side of the laser tube 31 to have a reflection surface 35a facing the first window 34. A restriction plate 36 having a slit 36a is arranged between the high-reflectance mirror 35 and the first window 34. The restriction plate 36 allows only that part of the laser beam L to pass through, which has a desirable characteristic.

A dividing mirror 37 is located on a second end side of the laser tube 31 so as to face the second window 34. The dividing mirror 37 is inclined at a predetermined angle in relation to the optical axis of the laser beam L. The dividing mirror 37 reflects only part of the laser beam L output from the second window 34 in a direction substantially perpendicular to the optical axis.

A first etalon 38 and a second etalon 39, which constitute band-narrowing means, and a high-reflectance return mirror 41, which is combined with the high-reflectance mirror 35 to constitute an optical resonator, are arranged in this order along the path of the laser beam L reflected by the divisional mirror 37. The laser beam L passes through the first and second etalons 38 and 39 and is reflected by the high-reflectance return mirror 41. The reflected laser beam L enters the second etalon 39 and first etalon 38 once again and is made incident on the divisional mirror 37. The spectral band width of the laser beam L is narrowed when it passes through the first and second etalons 38 and 39.

The laser beam L with the narrowed band is reflected by the divisional mirror 37 and returned through the second window 34 into the laser excitation unit 32 where the laser beam L was generated. The laser beam L, which has been returned to the laser excitation unit 32, is emitted from the first window 34 and passed through the slit 36a of the restriction plate 36. Then, the beam L is reflected by the high-reflectance mirror 35 and is once again passed through the slit 36a of the restriction plate 36. The laser beam L, which has passed through the slit 36a, enters the laser excitation unit 32 while diverging at an angle of $\theta$ by virtue of diffraction. The beam L is amplified by the laser excitation unit 32 and is emitted from the second window 34. Part of the laser beam L emitted from the second window 34, which runs without being divided by the dividing mirror 37, is led to the outside of the optical resonator as an output beam. The laser beam L with the narrowed band is reflected by the high-reflectance return mirror 41, returned to the laser excitation unit 32, and amplified therein.

Suppose that the size of the cross section of the laser beam L generated by the laser excitation unit 32 is, for example, 5 mm×20 mm, the width of the slit 36a of restriction plate 36 is 2 mm, the angle $\theta$ of diverging of the laser beam L passing through the slit 36a is 3 mrad, and the distance between the dividing mirror 37 and the slit 36a is 1 m. In this case, the cross section of the laser beam L at the dividing mirror 37 is 5 mm (height)×20 mm (width). Thus, if the dividing mirror 37 is situated, as shown in FIG. 2, such that the portion of the laser beam L, which corresponds to the upper 2 mm of the height of 5 mm, is made incident on the dividing mirror 37, the portion of the beam L corresponding to the lower 3 mm is output to the outside.

The width of 20 mm of the cross section of the laser beam L is determined by a gap W between the main electrodes 33 shown in FIG. 3.

A beam splitter 42 is situated in the path of the laser beam L which is not reflected by the dividing mirror 37 and is led to the outside. The beam splitter 42 is inclined at a predetermined angle. The beam splitter 42 reflects a small portion of the laser beam L (e.g. 1%) and allows the remaining portion (99%) to pass through. A scattering plate 43, a monitor etalon 44, a converging lens 45 and a linear line sensor 46 are successively arranged in the path of the laser beam L reflected by the beam splitter 42. The linear line sensor 46 detects a fringe pattern of the laser beam L which has passed the monitor etalon 44. A detection signal from the linear line sensor 46 is supplied to an oscilloscope 47. Thus, the oscilloscope 47 displays the intensity distribution of the fringe pattern of the laser beam L with the narrowed band.

According to the narrow-band laser apparatus having the above structure, when a high-voltage electric power is supplied to the main electrodes 33, a glow discharge occurs between the main electrodes 33. The gas laser medium sealed in the laser tube 31 is excited by the glow discharge, and a laser beam L is generated in a direction perpendicular to the direction of the discharge between the main electrodes 33.

The laser beam L is emitted from the first window 34 of the laser tube 31, and only the portion of the beam L which has a desirable characteristic is allowed to pass through the slit 36a of the restriction plate 36. The portion of the beam L, which has passed through the slit 36a, is reflected by the high-reflectance mirror 35 and is returned into the laser excitation unit 32. The laser beam L is then caused to advance while diverging at an angle $\theta$, and is emitted from the second window 34. The laser beam L emitted from the second window 34 is partly reflected and divided by the dividing mirror 37. The reflected beam L is passed through the first etalon 38 and the second etalon 39, whereby the spectral band width of the beam L is narrowed.

The laser beam L with the narrowed band is reflected by the high-reflectance return mirror 41 and then by the dividing mirror 37. The beam L is returned to the laser excitation unit 32 through the same path through which the beam was emitted from the unit 32. The returned beam L is amplified by the laser excitation unit 32 and is once again emitted from the second window through the same path while diverging at the angle $\theta$. Portion of the laser beam L is reflected and divided by the dividing mirror 37, while the remaining portion of the beam L is output to the outside.

In the present invention, the property of the laser beam L, wherein the beam L advances while diverging at the angle $\theta$, is utilized, and part of the beam L is divided by the dividing mirror 37 thereby to narrow the band of the beam L. By virtue of this structural feature, the space within the laser tube 31 where the laser beam L is generated by the glow discharge between the main electrodes 33 can substantially be used as the space where the laser beam L with the narrowed band is amplified. In other words, there is no need to provide a discharge space exclusively for amplifying the laser beam L with the narrowed band. As a result, the discharge space within the laser tube 31 can be reduced, and accordingly the entire apparatus can be reduced in size.

After the laser beam L with the narrowed band is reflected by the high-reflectance mirror 35, the beam L is amplified while advancing and diverging at the angle θ. Thus, the laser beam L can be sufficiently amplified, without using an optical system such as a beam expander. Specifically, unlike the case where optical parts such as the beam expander are used, the laser beam L is not absorbed or scattered by such optical parts, and therefore the output laser beam L neither decreases nor contains a scattered component.

Since the first etalon 38 and the second etalon 39 are used to narrow the band of the laser beam L, the beam L can be made to have a small spectral band width.

Figure 4A:
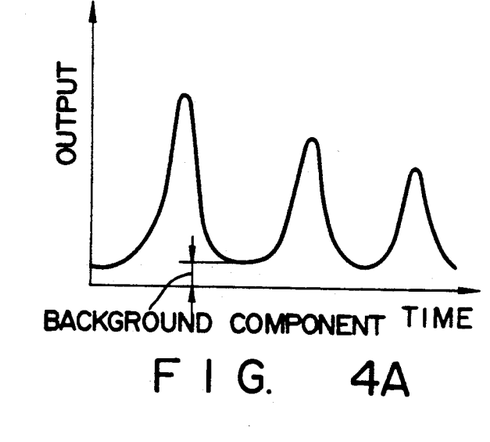
FIG. 4(A) shows a spectrum of a laser beam with a narrowed band, obtained by the apparatus of the invention.
Figure 4B:
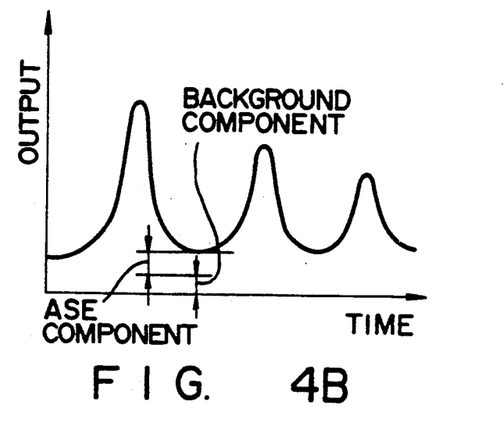
FIG. 4(B) shows a spectrum of a laser beam with a narrowed obtained by the conventional apparatus.

FIG. 4(A) shows a spectrum of a laser beam L obtained by the present invention, and FIG. 4(B) shows a spectrum of a laser beam obtained by the conventional narrow-band laser apparatus, shown in FIG. 1, using the self-amplification type optical resonator. These spectra of the laser beams L are displayed on the oscilloscope 47. Specifically, the fringe pattern of the laser beam L which has passed through the monitor etalon 44 is detected by the linear line sensor 46, and the detection signal is displayed on the oscilloscope 47.

According to the conventional narrow-band laser apparatus, as is shown in FIG. 4(B), the laser beam L contains an ASE (amplified spontaneous emission) component due to scattered light caused by the optical parts of the beam expander. That is, the beam L contains a component having a band which is not narrowed.

By contrast, according to the narrow-band laser apparatus of the present invention, as is shown in FIG. 4(A), the laser beam L hardly includes the ASE component, since the number of optical parts, which produce scattered light, is smaller than that of optical parts used in the conventional laser apparatus.

Background components shown in FIGS. 4(A) and 4(B) are caused by dark current in the linear line sensor 46 or ambient light.

Second to twelfth embodiments of the invention will now be described with reference to FIGS. 5 to 15. In these embodiments, the structural elements already used in the first embodiment are denoted by the same reference numerals, and descriptions thereof are omitted.

Figure 5:
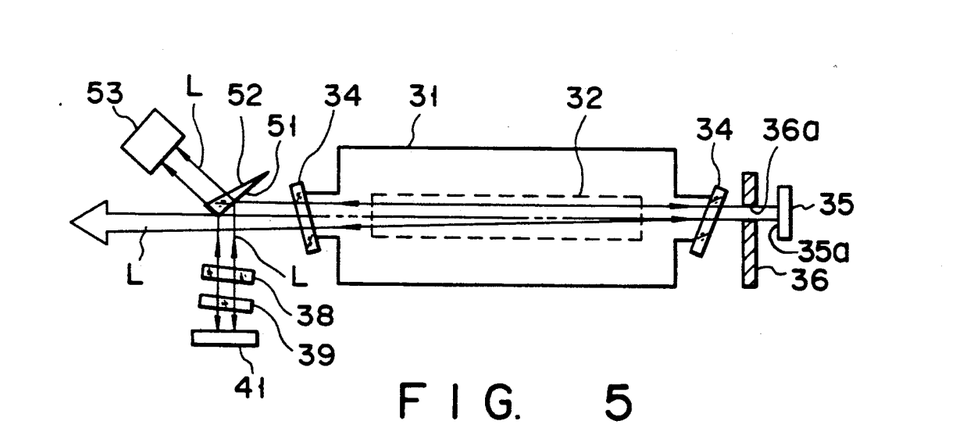
FIG. 5 shows the structure of a narrow-band laser apparatus according to a second embodiment of the invention.

FIG. 5 shows a second embodiment of the invention. In the second embodiment, in place of the dividing mirror 37, a prism 52 coated with a partial-reflection film 51 is employed a means for dividing part of the laser beam L. Most of the laser beam L reaching the partial-reflection film 51 of the prism 52 is reflected, and part of the beam L is passed through the film 51. The laser beam L, which has passed through the partial-reflection film 51, enters an output monitor 53. The monitor 53 monitors the output of the laser beam L.

Figure 6:
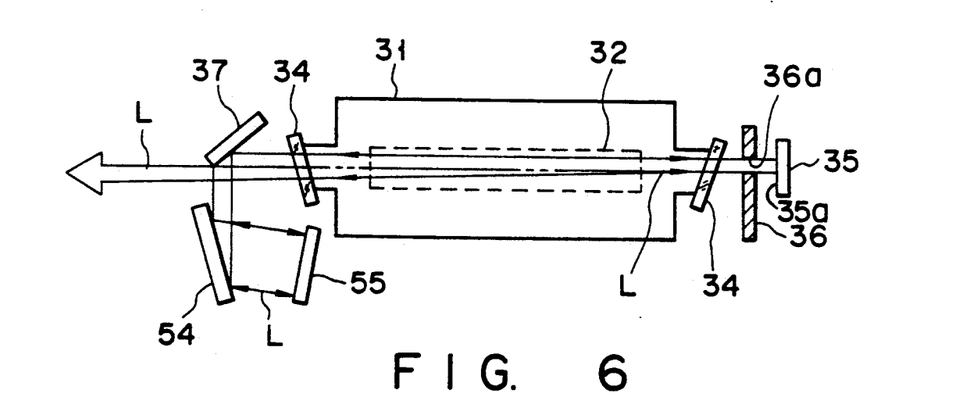
FIG. 6 shows the structure of a narrow-band laser apparatus according to a third embodiment of the invention.

FIG. 6 shows a third embodiment of the invention. In the third embodiment, an grazing-incidence type diffraction grading 54 is substituted for the etalon, as means for narrowing the band of the laser beam L divided by the dividing mirror 37. An adjustable mirror 55, the angle of which is adjustable, is situated so as to face the diffraction grading 54. The laser beam L with the narrowed band, which is emitted from the grazing-incidence type diffraction grating 54, is reflected by the adjustable mirror 55 and is returned to the diffraction grating 54 through the same light path.

Compared to the use of the etalon as means for narrowing the band of the beam, the use of the grazing-incidence type diffraction grating 54 can increase the light resistance and elongate the life of the apparatus.

Figure 7:
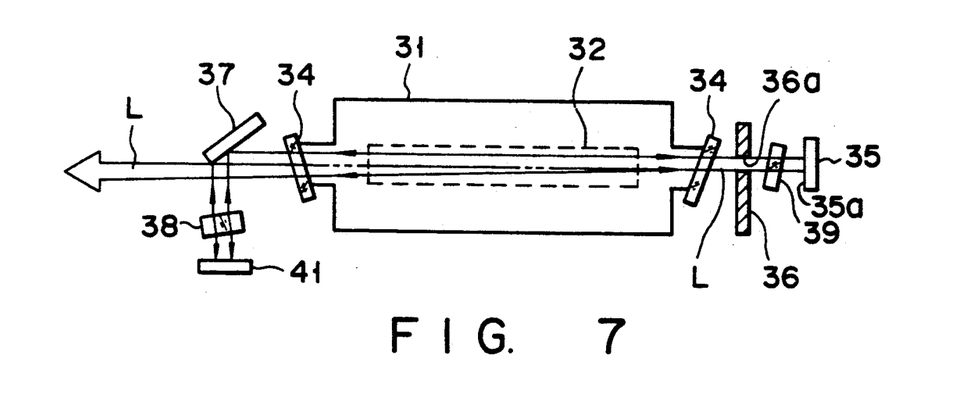
FIG. 7 shows the structure of a narrow-band laser apparatus according to a fourth embodiment of the invention.

FIG. 7 shows a fourth embodiment of the invention. In the fourth embodiment, the second etalon 39 of the first and second etalons 38 and 39 is situated between the high-reflectance mirror 35 and the restriction plate 6.

Although the distance between the high-reflectance mirror 35 and the restriction plate 36 is increased a little, the distance between the dividing mirror 37 and the high-reflectance return mirror 41 can be decreased, compared to the first embodiment in which both etalons 38 and 39 are arranged between the dividing mirror 37 and the high-reflectance return mirror 41. Since the etalons 38 and 39 are arranged in front of and in rear of the laser tube 1, the space for installation of the etalons 38 and 39 can be divided almost equally, and the arrangement of the etalons 38 and 39 becomes easier.

Figure 8:
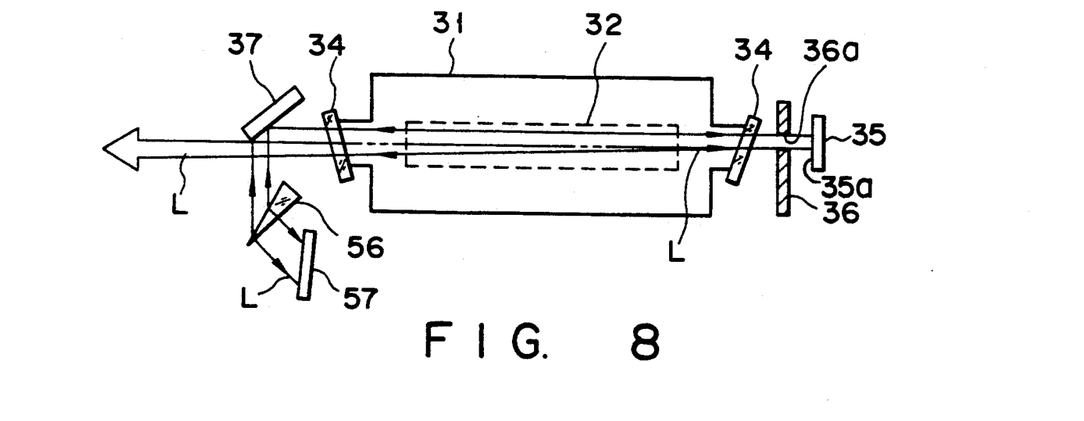
FIG. 8 shows the structure of a narrow-band laser apparatus according to a fifth embodiment of the invention.

FIG. 8 shows a fifth embodiment of the invention. In the fifth embodiment, the diameter of the laser beam L divided by the dividing mirror 37 is enlarged by a prism 56. The beam L with the enlarged width is made incident on a Littrow type diffraction grating 57 serving as means for narrowing the band of the beam L. The Littrow type diffraction grating 57 is arranged such that the incidence angle of the laser beam L coincides with the diffraction angle of the beam L.

With the above structure, the laser beam L with the narrowed band can be returned to the laser tube 31, without using the high-reflectance return mirror 41. In other words, the Littrow type diffraction grating 57 has the function of narrowing the band of the laser beam L a well as the function of returning the beam L with the narrowed band through the same path through which the beam L entered the diffraction grating 57. In addition, if the diameter of the laser beam L is enlarged by the prism 56 and the beam L is made incident on the diffraction grating 57, the wavelength selection performance of the diffraction grating 57 can be enhanced.

Figure 9:
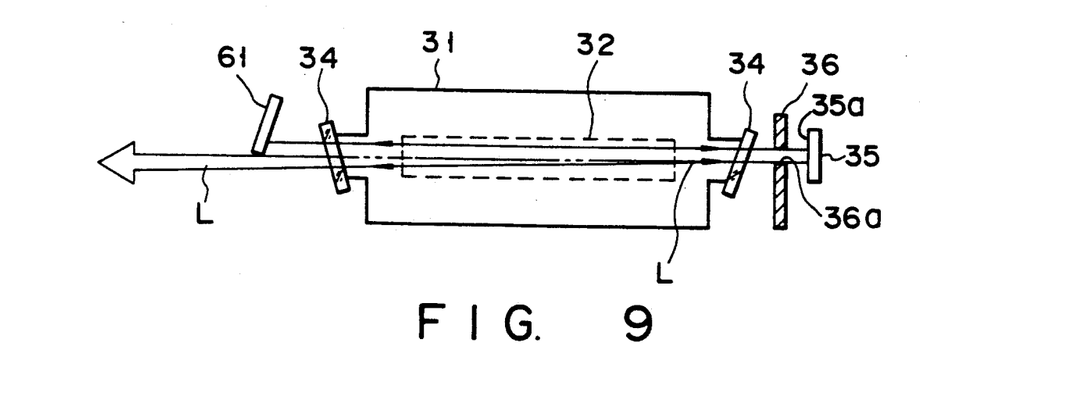
FIG. 9 shows the structure of a narrow-band laser apparatus according to a sixth embodiment of the invention.

FIG. 9 shows a sixth embodiment of the invention. In this embodiment, part of the laser beam L, which is emitted from the window 34 of the laser tube 31 while being flared, is made incident on a Littrow type diffraction grating 61 serving as band-narrowing means, in place of the dividing mirror 37. The laser beam L, the band of which has been narrowed by the diffraction grating 61, is directly returned to the laser tube 31. Specifically, the Littrow type diffraction grating 61 has the function of dividing part of the laser beam L, the function of narrowing the band of the divided beam L, and the function of returning the laser beam L with the narrowed band to the laser excitation unit 32 of the laser tube 31.

According to the sixth embodiment, optical parts to be used exclusively for returning the laser beam L with the narrowed band to the laser excitation unit 32 are not required. Thus, the structure of the apparatus is simplified, and the amount of scattered light in the output laser beam L can be decreased.

Figure 10:
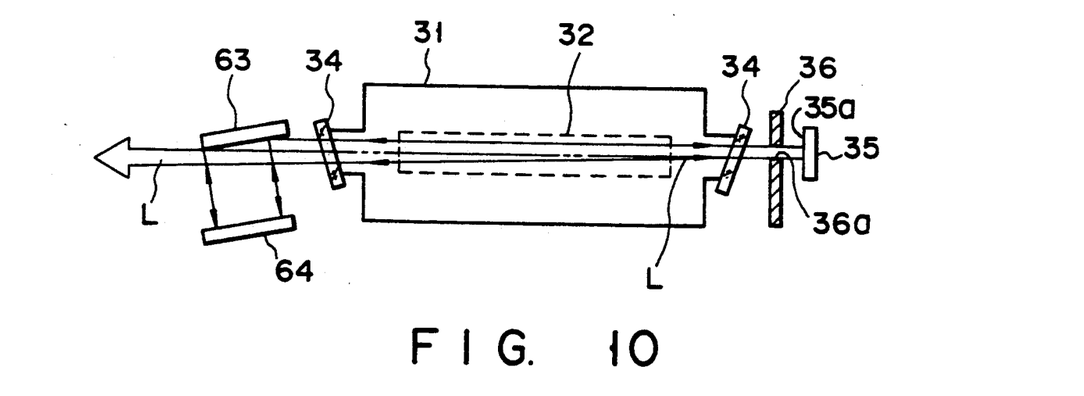
FIG. 10 shows the structure of a narrow-band laser apparatus according to a seventh embodiment of the invention.

FIG. 10 shows a seventh embodiment of the invention. In the seventh embodiment, the Littrow type diffraction grating 61 serving as band-narrowing means, shown in FIG. 9, is replaced by an grazing incidence type diffraction grating 63. An adjustable mirror 64, the angle of which is freely adjustable, is situated so as to face the diffraction grating 63. The diffraction angle of the laser beam L having the band narrowed by the grazing incidence type diffraction grating 63 is determined by the adjustable mirror 64.

With this structure, the grazing incidence type diffraction grating 63 has the function of dividing part of the laser beam L and the function of narrowing the band of the divided laser beam L. The laser beam L with the narrowed band is returned to the laser tube 31 by means of the adjustable mirror 64.

Figure 11:
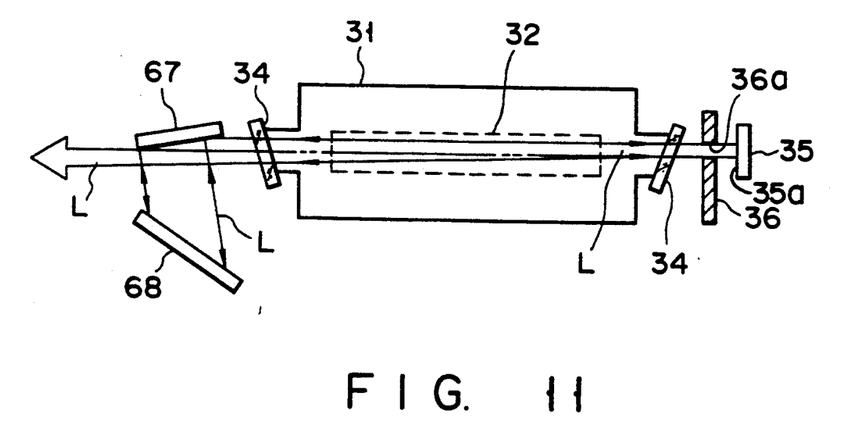
FIG. 11 shows the structure of a narrow-band laser apparatus according to an eighth embodiment of the invention.

FIG. 11 shows an eighth embodiment of the invention. The eighth embodiment is identical to the seventh embodiment of FIG. 10 in that part of the laser beam L emitted from the window 34 of the laser tube 1 is divided by an grazing incidence type diffraction grating 67. However, the eighth embodiment differs from the seventh embodiment in that the laser beam L having the band narrowed by the grazing incidence type diffraction grating 67 is not directly returned to the laser excitation unit 32. The band of the beam L is further narrowed by a Littrow type diffraction grating 68 situated to face the diffraction grating 67 and then the beam L is returned to the laser excitation unit 32. According to the eighth embodiment, the grazing incidence type diffraction grating 67 has the function of dividing the laser beam L and the function of narrowing the band of the divided laser beam L. On the other hand, the Littrow type diffraction grating 68 has the function of further narrowing the band of the laser beam L, which has been narrowed by the grazing incidence type diffraction grating 67 and the function of returning the laser beam L to the laser tube 31.

With this structure, the band of the laser beam L is narrowed by the grazing incidence type diffraction grating 67 and the Littrow type diffraction grating 68. Compared to the case where the band of the beam L is narrowed by single band-narrowing means, the spectral band width of the laser beam L can be further decreased. In other words, the band-narrowing performance can be enhanced.

Figure 12:
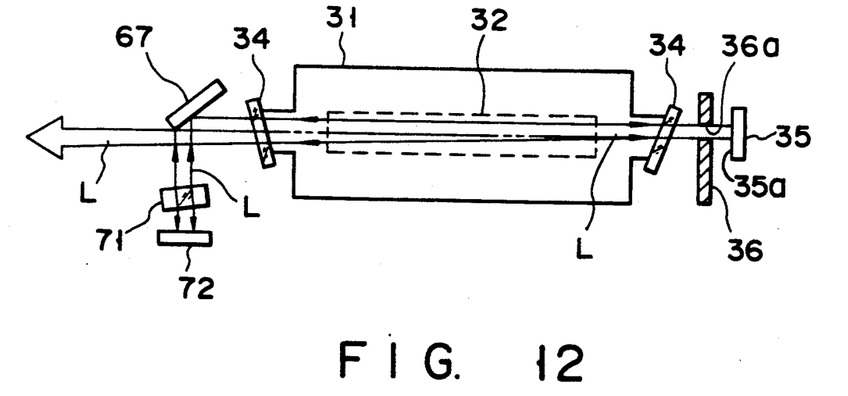
FIG. 12 shows the structure of a narrow-band laser apparatus according to a ninth embodiment of the invention.

FIG. 12 shows a ninth embodiment of the invention. The ninth embodiment is identical to the eighth embodiment of FIG. 11 in that part of the laser beam L emitted from the window 34 of the laser excitation unit 32 is divided by the grazing incidence type diffraction grating 67. However, in the ninth embodiment, an etalon 71 is used as band-narrowing means for further narrowing the band of the laser beam L, the band of which has already been narrowed by the grazing incidence type diffraction grating 67. The laser beam L having the band narrowed by the etalon 71 is returned to the laser tube 31 by means of a high-reflectance return mirror 72.

Figure 13:
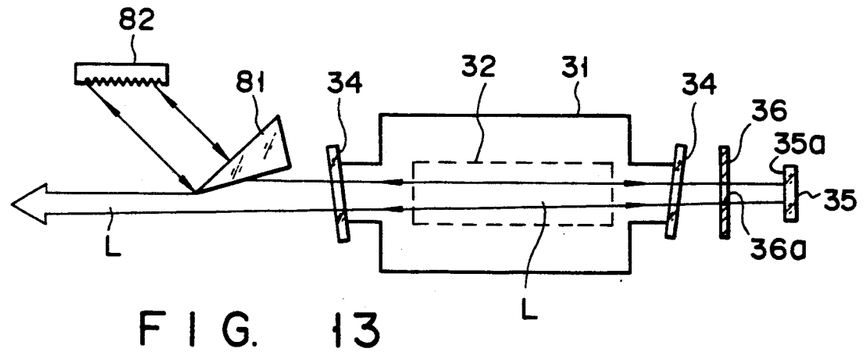
FIG. 13 shows the structure of a narrow-band laser apparatus according to a tenth embodiment of the invention.

FIG. 13 shows a tenth embodiment of the invention, wherein a prism 81 is situated in the light path of the laser beam L emitted from the window 34 of the laser excitation unit 32. The prism 81 is positioned so as to receive part of the laser beam L. Part of the laser beam L incident on the prism 81 is refracted and output along a changed light path. The beam L emitted from the prism 81 enters a Littrow type diffraction grating 82, so that the spectral band width of the beam L is narrowed. The laser beam L with the narrowed band is returned to the laser excitation unit 32 via the prism 81 along the light path through which the beam L was emitted from the excitation unit 32.

Figure 14:
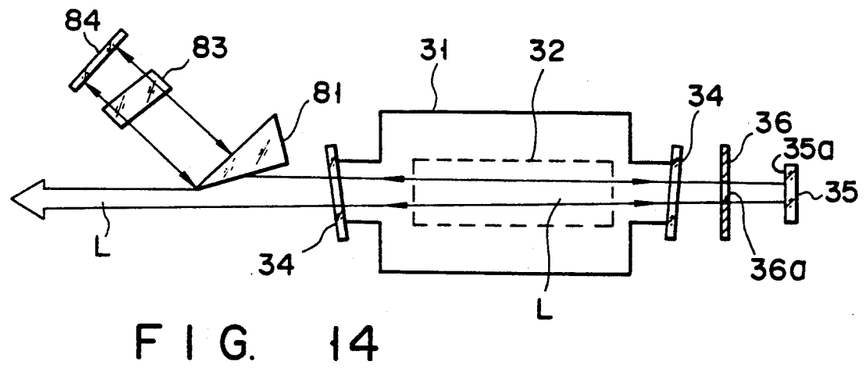
FIG. 14 shows the structure of a narrow-band laser apparatus according to an eleventh embodiment of the invention.

FIG. 14 shows an eleventh embodiment of the invention. In this embodiment, like the tenth embodiment, part of the laser beam L is divided by the prism 81. The spectral band width of the laser beam L divided by the prism 81 is narrowed by an etalon 83. The beam L with the narrowed band is reflected by a high-reflectance return mirror 84 and returned to the laser excitation unit 32.

Figure 15:
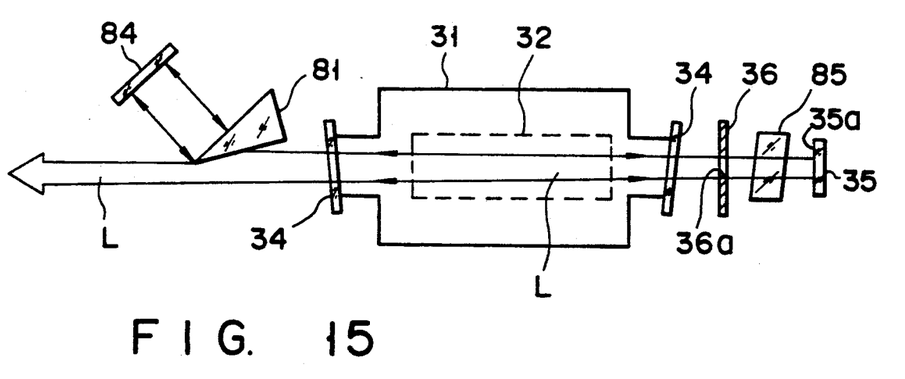
FIG. 15 shows the structure of a narrow-band laser apparatus according to a twelfth embodiment of the invention.

FIG. 15 shows a twelfth embodiment of the invention, which is identical to the tenth and eleventh embodiments in that part of the laser beam L is divided by the prism 81. The laser beam L divided by the prism 81 is reflected by the high-reflectance return mirror 84 and returned to the laser excitation unit 32. The spectral band width of the laser beam L is narrowed by an etalon 85. The etalon 85 is situated between the high-reflectance mirror 35 (located on the first end side of the laser tube 31) and the restriction plate 36 facing the high-reflectance mirror 35.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims ad their equivalents.

What is claimed is:

1. A narrow-band laser apparatus for narrowing the spectral band width of a laser beam, said apparatus comprising:

a laser tube containing a laser medium and having a pair of electrodes for generating a discharge, said laser medium being excited by the discharge between the electrodes, thus generating the laser beam;

a high-reflectance mirror having a reflection surface and situated within said reflection surface locking to one end side of the laser tube along the optical axis of the laser beam generated by the laser tube, said reflection surface reflecting the laser beam and causing the beam to travel while diverging at a predetermined angle;

dividing means, situated on the other end side of the laser tube such that a portion of said dividing means intersects a part of the laser beam which has been reflected by said reflection surface of the high-reflectance mirror to travel while diverging at the predetermined angle, for dividing said laser beam into a laser beam component which is incident on said portion of the dividing means, and a laser beam component which is not incident on said portion of the dividing means and is extracted as output light;

band-narrowing means for narrowing the spectral band width of the laser beam component which is incident on said portion of the dividing means; and a high-reflectance return mirror for reflecting the laser beam component having the band narrowed by the band-narrowing means, and returning the reflected beam component to the dividing means.

2. The apparatus according to claim 1, wherein said dividing means comprises a dividing mirror.

3. The apparatus according to claim 1, wherein said dividing means comprises a prism.

4. The apparatus according to claim 1, wherein said band-narrowing means comprises an etalon.

5. The apparatus according to claim 4, wherein said etalon is situated between said dividing means and said high-reflectance return mirror.

6. The apparatus according to claim 4, wherein said etalon comprises a first etalon situated between said dividing means and said high-reflectance return mirror, and a second etalon situated between said high-reflectance mirror and one end of said laser tube.

7. The apparatus according to claim 1, wherein said band-narrowing means comprises an grazing incidence type diffraction grating.

8. A narrow-band laser apparatus for narrowing the spectral band width of a laser beam, said apparatus comprising:
- a laser tube containing a laser medium and having a pair of electrodes for generating a discharge, said laser medium being excited by the discharge between the electrodes, thus generating the laser beam;
- a high-reflectance mirror having a reflection surface and situated with said reflection surface looking to one end side of the laser tube along the optical axis of the laser beam generated by the laser tube, said reflection surface reflecting the laser beam and causing the beam to travel while diverging at a predetermined angle;
- dividing means, situated on the other end side of the laser tube such that a portion of said dividing means intersects a part of the laser beam which has been reflected by said reflection surface of the high-reflectance mirror to travel while diverging at the predetermined angle, for dividing said laser beam into a laser beam component which is incident on said portion of the dividing means, and a laser beam component which is not incident on said portion of the dividing means and is extracted as output light; and
- band-narrowing means for narrowing the spectral band width of the laser beam component which is incident on said portion of the dividing means, and returning the laser beam component with the narrowed spectral band width to said dividing means.

9. The apparatus according to claim 8, wherein said band-narrowing means comprises a Littrow type diffraction grating.

10. A narrow-band laser apparatus for narrowing the spectral band width of a laser beam, said apparatus comprising:
- a laser tube containing a laser medium and having a pair of electrodes for generating a discharge, said laser medium being excited by the discharge between the electrodes, thus generating the laser beam;
- a high-reflectance mirror having a reflection surface and situated with said reflection surface looking to one end side of the laser tube along the optical axis of the laser beam generated by the laser tube, said reflection surface reflecting the laser beam and causing the beam to travel while diverging at a predetermined angle; and
- band-narrowing means, situated on the other end side of the laser tube along the optical axis such that a portion of said band-narrowing means intersects a part of the laser beam which has been reflected by said reflection surface of the high-reflectance mirror to travel while diverging at the predetermined angle, for dividing said laser beam into a laser beam component which is incident on said portion of the band-narrowing means, and a laser beam component which is not incident on said portion of the band-narrowing means and is extracted as output light, narrowing the spectral band width of the laser beam component which is incident on said portion of the band-narrowing means, reflecting the laser beam component with the narrowed spectral band width, and returning the reflected laser beam component to said laser tube.

11. The apparatus according to claim 10, wherein said band-narrowing means comprises a Littrow type diffraction grating.

12. A narrow-band laser apparatus for narrowing the spectral band width of a laser beam, said apparatus comprising:
- a laser tube comprising a laser medium and having a pair of electrodes for generating a discharge, said laser medium being excited by the discharge between the electrodes, thus generating the laser beam;
- a high reflectance mirror having a reflection surface and situated with said reflection surface looking to one end side of the laser tube along the optical axis of the laser beam generated by the laser tube, said reflection surface reflecting the laser beam and causing the beam to travel while diverging at a predetermined angle;
- a grazing incidence type diffraction grating, situated on the other end side of the laser tube such that a portion of said grazing incidence type diffraction grating intersects a part of the laser beam which has been reflected by said reflection surface of the high-reflectance mirror to travel while diverging at the predetermined angle, for dividing said laser beam into a laser beam predetermined which is incident on said portion of the grazing incidence type diffraction grating, and a laser beam component which is not incident on said portion of the grazing incidence type diffraction grating and is extracted as output light, and narrowing the spectral and width of the laser beam component which is incident on said portion of the grazing incidence type diffraction grating; and
- return means, situated to face said grazing incidence type diffraction grating, for returning the laser beam component having the spectral band width narrowed by said grazing incidence type diffraction grating to said laser tube.

13. The apparatus according to claim 12, wherein said return means comprises an adjustable mirror, the angle of which is freely adjustable, said adjustable mirror being situated to face said grazing incidence type diffraction grating.

14. The apparatus according to claim 12, wherein said return means comprises a Littrow type diffraction grating.

15. The apparatus according to claim 12, wherein said return means comprises a high-reflectance return mirror.

* * * * *

UNITED STATES PATENT AND TRADEMARK OFFICE
CERTIFICATE OF CORRECTION

PATENT NO. : 5,107,515

DATED : April 21, 1992

INVENTOR(S) : Naoto Nishida

It is certified that error appears in the above-identified patent and that said Letters Patent is hereby corrected as shown below:

Title page, item (21):
　　The application number is incorrect, should be,

--07/607,682--.

Signed and Sealed this

Sixth Day of July, 1993

Attest:

MICHAEL K. KIRK

Attesting Officer　　　Acting Commissioner of Patents and Trademarks